United States Patent
Imai et al.

(10) Patent No.: US 7,839,104 B2
(45) Date of Patent: Nov. 23, 2010

(54) MOTOR DRIVE CIRCUIT, FAN MOTOR, ELECTRONIC DEVICE, AND NOTEBOOK PERSONAL COMPUTER

(75) Inventors: Toshiyuki Imai, Gunma (JP); Tetsuya Yoshitomi, Gunma (JP); Joji Noie, Ota (JP)

(73) Assignees: Sanyo Electric Co., Ltd., Osaka (JP); Sanyo Semiconductor Co., Ltd., Ora-gun, Gunma (JP)

(*) Notice: Subject to any disclaimer, the term of this patent is extended or adjusted under 35 U.S.C. 154(b) by 0 days.

(21) Appl. No.: 12/252,289

(22) Filed: Oct. 15, 2008

(65) Prior Publication Data
US 2009/0167219 A1    Jul. 2, 2009

Related U.S. Application Data

(63) Continuation of application No. PCT/JP2007/074947, filed on Dec. 26, 2007.

(51) Int. Cl.
*H02P 6/20* (2006.01)

(52) U.S. Cl. .................. 318/268; 318/430; 318/504; 318/400.21

(58) Field of Classification Search .............. 318/430, 318/431, 268, 272, 293, 479, 504, 400.11, 318/400.21
See application file for complete search history.

(56) References Cited

U.S. PATENT DOCUMENTS

| | | | | | |
|---|---|---|---|---|---|
| 3,855,520 | A | * | 12/1974 | Stich | 323/283 |
| 4,587,467 | A | * | 5/1986 | Breiner | 318/272 |
| 5,036,267 | A | * | 7/1991 | Markunas et al. | 322/10 |
| 6,841,954 | B2 | * | 1/2005 | Nakabayashi | 318/62 |

FOREIGN PATENT DOCUMENTS

| | | | |
|---|---|---|---|
| EP | 2 077 611 A2 | * | 7/2009 |
| JP | 62-016088 | | 1/1987 |
| JP | 05-228291 | * | 9/1993 |
| JP | 08-266086 | | 10/1996 |
| JP | 2006-174648 | | 6/2006 |

* cited by examiner

*Primary Examiner*—Bentsu Ro
(74) *Attorney, Agent, or Firm*—SoCal IP Law Group LLP; Steven C. Sereboff; John E. Gunther

(57) ABSTRACT

A motor drive circuit includes: a pulse generation circuit configured to generate a pulse signal whose duty ratio of one logic level is increased as a drive voltage is increased in accordance with a target rotation speed of a motor; and a drive control circuit that configured to drive the motor with the drive voltage using a duty ratio higher than the duty ratio of the pulse signal when the motor starts rotating from the stopped state, and configured to drive the motor with the drive voltage during a period when the pulse signal is at the one logic level after the motor starts rotating, based on a rotation signal corresponding to the rotation of the motor.

15 Claims, 2 Drawing Sheets

MOTOR DRIVE CIRCUIT, FAN MOTOR, ELECTRONIC DEVICE, AND NOTEBOOK PERSONAL COMPUTER

CROSS-REFERENCE TO RELATED APPLICATION

This is a continuation application of International Patent Application No. PCT/JP2007/074947 filed Dec. 26, 2007, of which full contents are incorporated herein by reference.

BACKGROUND OF THE INVENTION

1. Field of the Invention

The present invention relates to a motor drive circuit, a fan motor, an electronic device, and a notebook personal computer.

2. Description of the Related Art

In an electronic device such as a notebook personal computer, a fan motor is used to cool down a heat generating part such as a processor. Although the cooling performance can be improved by maximizing the rotation speed of the motor when the fan motor is used to cool down a heat generating part, the rotation speed of the motor must be adjusted in accordance with a heat generation amount for reducing power consumption and noise. For example, the rotation speed of the motor can be adjusted by increasing or decreasing a drive voltage applied to the motor coil in accordance with the heat generation amount.

To further enhance the reduction of power consumption and noise, intermittent drive is performed in addition to the control of the drive voltage. For example, Japanese Patent Application Laid-Open Publication No. 2006-174648 discloses a mode of reducing a rate of application of the drive voltage to the motor coil as the target rotation speed of the motor is lowered while performing control such that the drive voltage is reduced in accordance with a target rotation speed of the motor.

By reducing a rate of application of the drive voltage to the motor coil as the target rotation speed of the motor is lowered, the rotation speed of the motor can be controlled to a lower rotation speed as compared to the case of control only with adjustment of the drive voltage, and the reduction of power consumption and noise can be achieved.

By the way, when the motor rotates, a cogging torque is generated due to the attractive force and repulsive force in accordance with relationship between positions of magnetic poles and a position of the motor coil. While the motor is stopped, the motor coil is often located at a position causing the lowest cogging torque. Therefore, a torque must be greater than the cogging torque to start rotation from the stopped state of the motor.

In the mode disclosed in Japanese Patent Application Laid-Open Publication No. 2006-174648, if the rotation speed of the motor is lowered, since the drive voltage is low and the rate of the drive is reduced, the torque for driving the motor is also reduced. Therefore, although the motor can continuously be rotated with a small torque due to the effect of inertia while the motor is rotating, when the rotation is started at a low speed while the motor is stopped, the motor may not be activated at low speed since the torque driving the motor cannot exceed the cogging torque. Especially, in the case of single-phase motors, the activation at low speed is likely to be difficult since a difference is larger between the maximum level and the minimum level of the cogging torque as compared to three-phase motors.

SUMMARY OF THE INVENTION

The present invention was conceived in view of the above problems and it is therefore one object of the present invention to enable a motor to be activated at low speed.

A motor drive circuit according to an aspect of the present invention, includes: a pulse generation circuit configured to generate a pulse signal whose duty ratio of one logic level is increased as a drive voltage is increased in accordance with a target rotation speed of a motor; and a drive control circuit configured to drive the motor with the drive voltage using a duty ratio higher than the duty ratio of the pulse signal when the motor starts rotating from the stopped state, and to drive the motor with the drive voltage during a period when the pulse signal is at the one logic level after the motor starts rotating, based on a rotation signal corresponding to the rotation of the motor.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
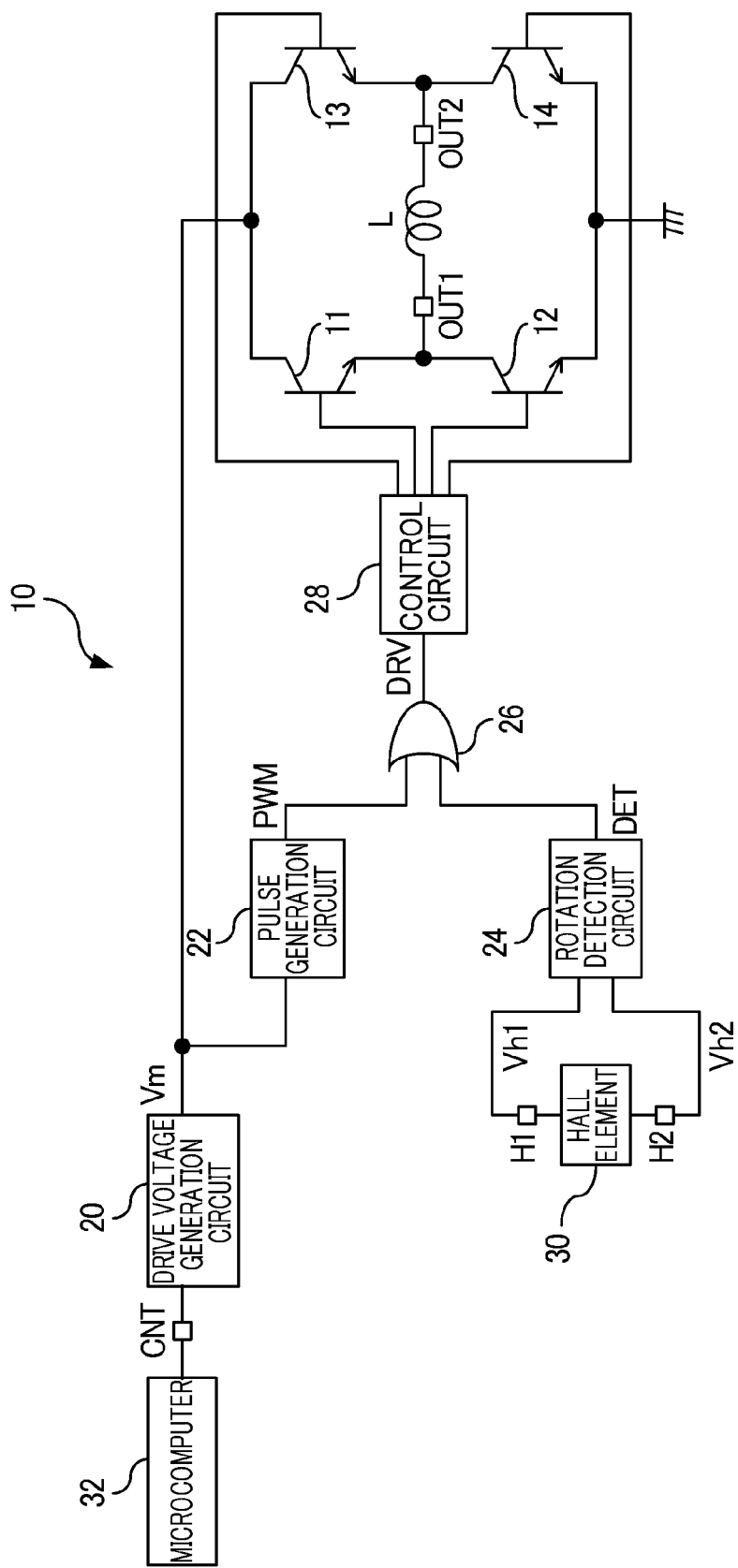
FIG. 1 is a view of a configuration of a motor drive circuit that is an embodiment of the present invention.

FIG. 1 is a view of a configuration of a motor drive circuit that is an embodiment of the present invention. For example, a motor drive circuit 10 is built into a fan motor for cooling a heat generation part (apparatus to be cooled) such as a processor in an electronic device such as a notebook personal computer and is used to drive a motor for rotating a cooling fan.

The motor drive circuit 10 is a circuit that drives a single-phase fan motor and includes an NPN transistors 11 to 14, a drive voltage generation circuit 20, a pulse generation circuit 22, a rotation detection circuit 24, an OR circuit 26, and a control circuit 28. In this embodiment, the motor drive circuit 10 is integrated, has a motor coil L connected between terminals OUT1, OUT 2, has a hall element 30 between terminals H1, H2 to output a voltage Vh1 and a voltage Vh2 (rotation signal) corresponding to the rotational position of the motor, and receives a signal for controlling the rotation speed of the motor through a terminal CNT from a microcomputer 32. The voltages Vh1 and Vh2 are voltages having phases reversed to each other and varying in a sinusoidal wave shape.

The NPN transistors 11 to 14 make up an H-bridge circuit for driving a motor coil L with a drive voltage Vm. For example, when the NPN transistors 11, 14 are turned on and the NPN transistors 12, 13 are turned off, the motor coil L is driven with the drive voltage Vm such that a current is applied in the direction from the terminal OUT1 to the terminal OUT2. For example, when the NPN transistors 12, 13 are turned on and the NPN transistors 11, 14 are turned off, the motor coil L is driven with the drive voltage Vm such that a current is applied in the direction from the terminal OUT2 to the terminal OUT1. If the motor drive circuit 10 is integrated, the NPN transistors 11 to 14 can be provided on the outside of the integrated circuit.

The drive voltage generation circuit 20 generates the drive voltage Vm increased in accordance with increase in the target rotation speed depending on the signal input from the microcomputer 32 indicating the target rotation speed. The drive voltage generation circuit 20 can be made up of a regulator circuit that generates the drive voltage Vm by reducing, for example, the power supply voltage of 5.0V depending on the signal from the microcomputer 32. The drive voltage Vm output from the drive voltage generation circuit 20 is used to drive the motor coil L. Therefore, the rotation speed of the motor is accelerated as the drive voltage Vm is increased, and the rotation speed of the motor is decelerated as the drive voltage Vm is decreased.

The pulse generation circuit 22 generates a pulse signal PWM with, for example, a duty ratio of H-level increased as the drive voltage Vm is increased. This pulse signal PWM is used for the intermittent drive of the motor coil L. In this embodiment, when the intermittent drive of the motor coil L is performed based on the pulse signal PWM, it is assumed that the motor coil L is driven during the period when the pulse signal PWM is H-level. The pulse generation circuit 22 can be implemented with the use of a reference voltage generation circuit, a triangular wave generation circuit, and a comparison circuit disclosed in Japanese Patent Application Laid-Open Publication No. 2006-174648, for example.

The rotation detection circuit 24 detects whether the motor is rotated, based on the voltages Vh1, Vh2 output from the hall element 30 to output a detection signal DET (rotation detection signal). In this embodiment, while the motor is stopped, the detection signal DET is H-level, and when the rotation of the motor is detected, the detection signal DET becomes L-level. Although the rotation of the motor is detected based on the voltages Vh1, Vh2 output from the hall element 30 in this embodiment, the rotation of the motor may be detected with the use of a signal varying in accordance with the rotation of the motor, such as an FG (frequency generator) signal having a frequency corresponding to the rotation speed of the motor, other than the output from the hall element 30.

The OR circuit 26 outputs a drive signal DRV, which is a logical sum of the pulse signal PWM output from the pulse generation circuit 22 and the detection signal DET output from the rotation detection circuit 24. Since the detection signal DET is H-level during a period from the stopped state of the motor until the rotation of the motor is detected, the drive signal DRV is kept at H-level in this period regardless of the pulse signal PWM. When the rotation of the motor is detected and the detection signal DET becomes L-level, the drive signal DRV is changed depending on the pulse signal PWM.

The control circuit 28 complementarily turns on/off the NPN transistors 11, 14 and the NPN transistors 12, 13 in accordance with the rotational position of the motor. The control circuit 28 appropriately turns on/off the NPN transistors 11 to 14 such that the motor coil L is driven by the drive voltage Vm during the period when the drive signal is H-level. Therefore, if the drive signal DRV is kept at H-level, the motor coil L is continuously driven with the drive voltage Vm. On the other hand, if the drive signal DRV is changed in accordance with the pulse signal PWM, the motor coil L is intermittently driven by the drive voltage Vm. The state of the motor coil L continuously driven with the drive voltage Vm is referred to as full drive.

A circuit made up of the rotation detection circuit 24, the OR circuit 26, and the control circuit 28 is one example of a drive control circuit of the present invention, and a circuit made up of the OR circuit 26 and the control circuit 28 is one example of a drive circuit of the present invention.

Figure 2:
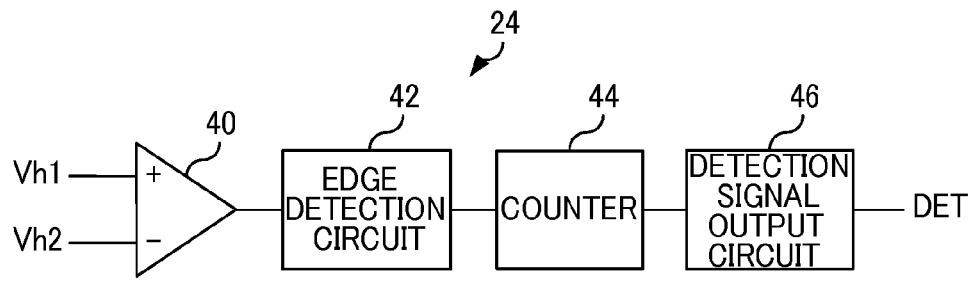
FIG. 2 is a view of an exemplary configuration of a rotation detection circuit.

FIG. 2 is a view of an exemplary configuration of the rotation detection circuit 24. The rotation detection circuit 24 includes a comparator 40, an edge detection circuit 42, a counter 44, and a detection signal output circuit 46. The comparator 40 outputs a comparison result of the voltages Vh1, Vh2. In this embodiment, it is assumed that the output of the comparator 40 becomes H-level if the voltage Vh1 is greater than the voltage Vh2 and that the output of the comparator 40 becomes L-level if the voltage Vh1 is less than the voltage Vh2. The edge detection circuit 42 detects edges of the signal output from the comparator 40, i.e., a change from L-level to H-level and a change from H-level to L-level and outputs a pulse in accordance with the detection of the edges. The counter 44 counts the number of pulses output from the edge detection circuit 42. The detection signal output circuit 46 changes the detection signal DET to L-level when the count value of the counter attains a predetermined value (e.g., "4"). While the motor is stopped, it is assumed that the count value of the counter 44 is reset to be zero and that the detection signal DET is reset to be H-level.

Figure 3:
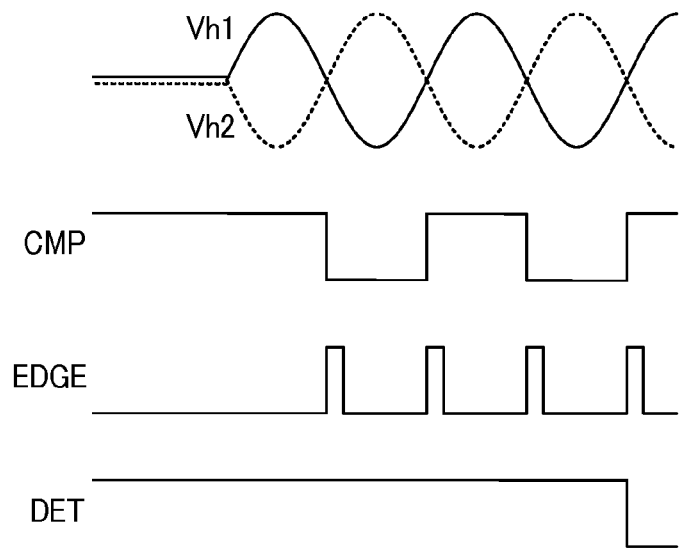
FIG. 3 is a view of an example of the operation of the rotation detection circuit.

An example of operation will be described for the case of starting rotation from the stopped state of the motor in the motor drive circuit 10. FIG. 3 is a view of an example of operation of the rotation detection circuit 24. When the motor is stopped, the voltages Vh1, Vh2 output from the hall element 30 are not changed, and the signal CMP output from the comparator 40 is not also changed. In this embodiment, it is assumed that the signal CMP output from the comparator 40 is H-level while the motor is stopped.

When the signal indicating the target rotation speed of the motor is input from the microcomputer 32, the drive voltage generation circuit 20 generates the drive voltage Vm corresponding to the target rotation speed. The pulse generation circuit 22 generates the pulse signal PWM with the duty corresponding to the drive voltage Vm. When the motor is stopped, the count value of the counter 44 is reset to be zero and the detection signal DET output from the detection signal output circuit 46 is reset to be H-level. Therefore, the drive signal DRV output from the OR circuit 26 is kept at H-level regardless of the pulse signal PWM. Therefore, the control circuit 28 starts the full drive of the motor coil L with the drive voltage Vm. After the motor starts rotating in the full drive, the voltage Vh1, Vh2 output from the hall element 30 is changed in accordance with the rotation of the motor, and the signal CMP output from the comparator is also changed. The change in the signal CMP causes the edge detection circuit 42 to output the signal EDGE and the count value of the counter 44 is increased.

When the count value of the counter 44 attains a predetermined value (e.g., "4"), it is determined that the motor starts rotating and the detection signal DET output from the detection signal output circuit 46 is changed to L-level. When the detection signal DET becomes L-level, the drive signal DRV output from the OR circuit 26 is changed depending on the pulse signal PWM, and the motor coil L is intermittently driven in depending on the pulse signal PWM. That is, the motor drive circuit 10 performs the full drive until the motor starts rotating and performs the intermittent drive after the motor starts rotating.

Figure 4:
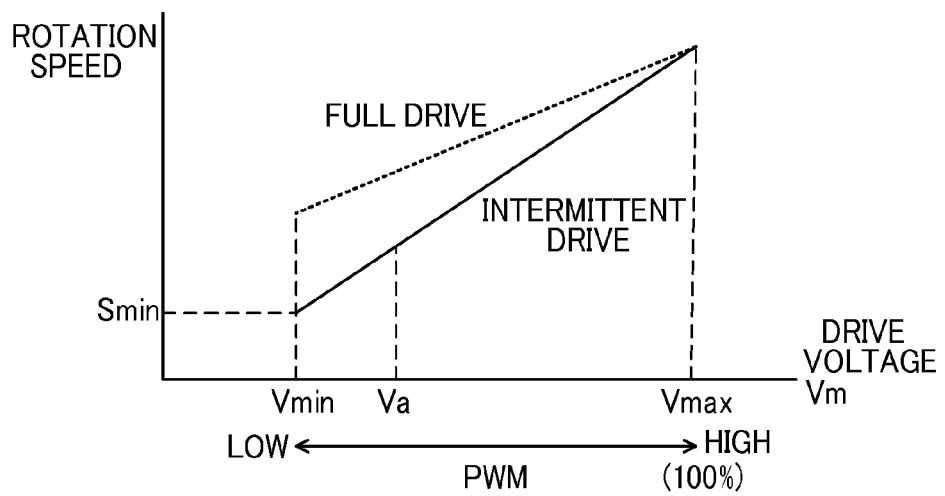
FIG. 4 is a view of an example of relationship between the drive voltage and the motor rotation speed.

FIG. 4 is a view of an example of relationship between the drive voltage Vm and the motor rotation speed. As shown in FIG. 4, the rotation speed is accelerated as the drive voltage Vm is increased, and the rotation speed is decelerated as the drive voltage Vm is decreased. Since the duty ratio of H-level is increased in the pulse signal PWM as the drive voltage Vm is increased, the rotation speed can be controlled to a lower speed in the intermittent drive rather than the full drive if the variation range of the drive voltage Vm is the same. If the duty ratio of H-level is 100% in the pulse signal PWM when the drive voltage Vm is at the maximum level (Vmax), the maximum rotation speed in the case of the intermittent drive is the same as that of the full drive and the cooling performance can be maintained.

While the motor is rotating, the rotation speed of the motor can be decelerated by reducing the duty ratio of H-level of the pulse signal PWM. When the drive voltage Vm reaches the minimum level (Vmin), the rotation speed of the motor becomes the minimum speed Smin. On the other hand, when it is desired to start the rotation of the motor at the rotation speed Smin from the stopped state of the motor, the starting torque may not be acquired if the intermittent drive is started with the drive voltage Vm set to Vmin. In other words, when the motor is activated in the intermittent drive, the drive voltage Vm must be Va higher than Vmin in some cases. Even in such cases, since the motor drive circuit 10 of the embodiment performs the full drive until the motor starts rotating when it is desired to start the rotation of the motor at the rotation speed Smin from the stopped state of the motor, the starting torque greater than the cogging torque can be acquired and the rotation of the motor can be started. Since a necessary torque becomes smaller due to the effect of inertia after the motor starts rotating as compared to the time of activation, the motor drive circuit 10 is switched from the full drive to the intermittent drive and the rotation speed can be controlled to Smin.

The motor drive circuit 10 of the embodiment has been described. The motor is fully driven with the drive voltage Vm when the rotation is started from the stopped state of the motor, and after the motor starts rotating, the motor is driven with the drive voltage Vm during a period when the PWM signal is H-level. Therefore, the rotation of the motor can be started even with the drive voltage Vm unable to start the rotation of the motor in the case of driving only for a period when the PWM signal is H-level, and the motor can be activated at a lower speed as compared to the case of driving only for a period when the PWM signal is H-level.

If the heat generation amount of the heat generation part such as a processor is small in an electric device such as a notebook personal computer, the rotation speed of the fan can be a sufficiently low speed by using this motor drive circuit 10 and the power consumption can be reduced.

The above embodiments of the present invention are simply for facilitating the understanding of the present invention and are not in any way to be construed as limiting the present invention. The present invention may variously be changed or altered without departing from its spirit and encompass equivalents thereof.

For example, although the driving rate is 100%, i.e., the full drive when starting the rotation of the motor in this embodiment, the driving rate (duty ratio) is not limited to 100% when starting the rotation of the motor and may be any rate higher than the duty ratio of H-level of the pulse signal PWM. For example, a pulse signal having a duty ratio of H-level higher than the pulse signal PWM may be separately generated, and the motor may be driven with the drive voltage Vm during a period when the separately generated pulse signal is H-level.

For example, although the motor drive circuit 10 is used for driving a single-phase fan motor, the motor to be driven is not limited to the fan motor and the number of phases is not limited to a single phase.

What is claimed is:

1. A motor drive circuit comprising:
   a pulse generation circuit that receives a variable drive voltage and generates a pulse width modulation signal having a first duty ratio, wherein the first duty ratio is increased as the drive voltage is increased; and
   a drive control circuit configured
      to supply to a motor coil a drive current at a second duty ratio higher than the first duty ratio when a rotation detection signal indicates the motor is starting from a stopped state, and
      to supply to the motor coil the drive current according to the drive voltage modulated by the pulse width modulation signal when the rotation detection signal indicates the motor has started rotating.

2. The motor drive circuit of claim 1, wherein the drive control circuit includes:
   a rotation detection circuit configured to output the rotation detection signal.

3. The motor drive circuit of claim 2, wherein the second duty ratio is 100%.

4. The motor drive circuit of claim 2, wherein
   the rotation detection circuit indicates the motor has started rotating after the motor rotates a predetermined number of revolutions from the stopped state.

5. The motor drive circuit of claim 4, wherein
   the rotation detection circuit comprises a counter to count a number of revolutions of the motor based on a signal indicating a motor rotational position,
   the counter is reset when the motor is in the stopped state, and
   the rotation detection signal is output when a count value of the counter is equal to or greater than a predetermined value.

6. The motor drive circuit of claim 5, wherein
   the rotation detection circuit further comprises:
      a comparator to convert a sinusoidal signal indicating a motor rotational position into a square wave signal, and
      an edge detector to output clock pulses corresponding to rising and falling edges of the square wave signal,
      wherein the counter counts the clock pulses.

7. The motor drive circuit of claim 1, wherein the second duty ratio is 100%.

8. A fan motor comprising:
   a fan;
   a motor configured to drive the fan; and
   a motor drive circuit configured to drive the motor,
   the motor drive circuit including:
      a pulse generation circuit that receives a variable drive voltage and generates a pulse width modulation signal having a first duty ratio, wherein the first duty ratio is increased as the drive voltage is increased; and
      a drive control circuit configured
         to supply to a motor coil a drive current at a second duty ratio higher than the first duty ratio when a rotation detection signal indicates the motor is starting from a stopped state, and
         to supply to the motor coil the drive current according to the drive voltage modulated by the pulse width modulation signal when the rotation detection signal indicates the motor has started rotating.

9. An electronic device comprising:
a fan;
a motor configured to drive the fan;
a motor drive circuit configured to drive the motor; and
an apparatus to be cooled by the fan,
the motor drive circuit including:
- a pulse generation circuit that receives a variable drive voltage and generates a pulse width modulation signal having a first duty ratio, wherein the first duty ratio is increased as the drive voltage is increased; and
- a drive control circuit configured
  - to supply to a motor coil a drive current at a second duty ratio higher than the first duty ratio when a rotation detection signal indicates the motor is starting from a stopped state, and
  - to supply to the motor coil the drive current according to the drive voltage modulated by the pulse width modulation signal when the rotation detection signal indicates the motor has started rotating.

10. A notebook personal computer comprising:
a fan;
a motor configured to drive the fan;
a motor drive circuit configured to drive the motor; and
a processor to be cooled by the fan,
the motor drive circuit including:
- a pulse generation circuit that receives a variable drive voltage and generates a pulse width modulation signal having a first duty ratio, wherein the first duty ratio is increased as the drive voltage is increased; and
- a drive control circuit configured
  - to supply to a motor coil a drive current at a second duty ratio higher than the first duty ratio when a rotation detection signal indicates the motor is starting from a stopped state, and
  - to supply to the motor coil the drive current according to the drive voltage modulated by the pulse width modulation signal when the rotation detection signal indicates the motor has started rotating.

11. A motor drive circuit that receives a variable drive voltage, comprising:
- a pulse generation circuit to generate a pulse width modulation signal whose duty ratio is increased as the drive voltage is increased;
- a rotation detection circuit to output a rotation detection signal indicating whether or not the motor has started rotating from a stopped state;
- a logic circuit to logically sum the pulse width modulation signal and the rotation detection signal to output a drive signal; and
- a control circuit to drive the motor with the drive voltage modulated by the drive signal, whereby
  - the control circuit drives the motor with the drive voltage at 100% duty ratio when the motor starts rotating from the stopped state, and
  - the control circuit drives the motor with the drive voltage at the duty ratio of the pulse width modulation signal after the motor starts rotating.

12. The motor drive circuit of claim 11, wherein
the rotation detection circuit outputs the rotation detection signal indicating the motor has started rotating from a stopped state after the motor rotates a predetermined number of revolutions from the stopped state.

13. The motor drive circuit of claim 12, wherein
the rotation detection circuit comprises a counter to count a number of revolutions of the motor based on a signal indicating a motor rotational position,
the counter is reset when the motor is in the stopped state, and
the rotation detection circuit outputs the rotation detection signal indicating the motor has started rotating from a stopped state when a count value of the counter is equal to or greater than a predetermined value.

14. The motor drive circuit of claim 13, wherein
the rotation detection circuit further comprises:
- a comparator to convert a sinusoidal signal indicating a motor rotational position into a square wave signal, and
- an edge detector to output clock pulses corresponding to rising and falling edges of the square wave signal,
wherein the counter counts the clock pulses.

15. A motor drive circuit that receives a variable drive voltage and a rotation detection signal indicating whether or not a motor has started rotating from a stopped state, the motor drive circuit comprising:
- a pulse generation circuit to generate a pulse width modulation signal whose duty ratio is increased as the drive voltage is increased;
- a logic circuit to logically sum the pulse width modulation signal and the rotation detection signal to output a drive signal; and
- a control circuit to drive the motor with the drive voltage modulated by the drive signal, wherein
  - the control circuit drives the motor with the drive voltage at 100% duty ratio when the rotation detection signal indicates the motor is starting from a stopped state, and
  - the control circuit drives the motor with the drive voltage at the duty ratio of the pulse width modulation signal when the rotation detection signal indicates the motor has started rotating.

* * * * *